US006500563B1

(12) United States Patent
Datta et al.

(10) Patent No.: US 6,500,563 B1
(45) Date of Patent: Dec. 31, 2002

(54) ELASTIC FILMS INCLUDING CRYSTALLINE POLYMER AND CRYSTALLIZABLE POLYMERS OF PROPYLENE

(75) Inventors: Sudhin Datta, Houston, TX (US); Jeffrey Middlesworth, Wauconda, IL (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/569,362

(22) Filed: May 11, 2000

Related U.S. Application Data
(60) Provisional application No. 60/133,966, filed on May 13, 1999.

(51) Int. Cl.$^7$ ................................. B32B 27/32
(52) U.S. Cl. ...................... 428/521; 428/517; 428/910; 525/240; 525/241
(58) Field of Search ................... 525/240, 241; 428/500, 515, 516, 517, 521, 910

(56) References Cited

U.S. PATENT DOCUMENTS 3,282,992 A   11/1966   Harris (List continued on next page.)

FOREIGN PATENT DOCUMENTS

| DE | 19749765    | 6/1998 |
| EP | 0545196     | 6/1993 |
| EP | 0 549 900 B1 | 8/1996 |
| EP | 0 576 970 B1 | 1/1998 |
| EP | 0890612     | 6/1998 |
| WO | WO9829504   | 7/1998 |

OTHER PUBLICATIONS (JP–10–152531) Jun. 1998; machine translation of the JP document obtained on the JPO web site.*
Derwent English Abstract of Reference AG, DE19749765.
Derwent English Abstract of Reference AH, EP0890612.
Derwent Abstract for foreign language publication—EP 0 549 900 B1.
Derwent Abstract for foreign language publication—EP 0 576 970 B1.
"Near Monodisperse Ethylene–Propylene Copolymers by Direct Ziegler–Natta Polymerization. Preparation, Characterization, Properties", Ver Strate, et al, Macromolecules, vol. 21 No. 12, p. 3360–3371, Dec. 1988.
"Elastomeric Polypropylenes from Alumina–Supported Tetraalkyl Group IVB Catalyst. 1. Synthesis and Properties of High Molecular Weight Stereoblock Homopolymers", Collette, et al, Macromolecules, vol. 22, No. 10, p. 3851–3866, Oct. 1989.

(List continued on next page.)

Primary Examiner—D. Lawrence Tarazano
(74) Attorney, Agent, or Firm—Charles E. Runyan

(57) ABSTRACT

Improved thermoplastic polymer elastic film blend compositions including a crystalline isotactic polypropylene component and a crystallizable alpha-olefin and propylene copolymer component, the copolymer having crystallizable alpha-olefin sequences. In a preferred embodiment, improved thermoplastic polymer blends are provided made up of from 0% to 95%, preferably 2% to 40 weight % of the crystalline isotactic polypropylene and from 5% to 100%, preferably 60% to 98 weight % of a crystallizable ethylene and propylene copolymer, wherein the copolymer has isotactically crystallizable propylene sequences and is predominately propylene. The resultant blends manifest unexpected compatibility characteristics, and improved resistance to elastic deformation of the crystalline isotactic polypropylene and from of a crystallizable ethylene and propylene copolymer.

13 Claims, 3 Drawing Sheets

U.S. PATENT DOCUMENTS

| | | |
|---|---|---|
| 3,378,606 A | 4/1968 | Kontos |
| 3,853,969 A | 12/1974 | Kontos |
| 3,882,197 A | 5/1975 | Fritz et al. |
| 3,888,949 A | 6/1975 | Shih |
| 4,368,565 A | 1/1983 | Schwartz |
| 4,461,872 A | 7/1984 | Su |
| 4,540,753 A | 9/1985 | Cozewith et al. |
| 5,057,475 A | 10/1991 | Canich et al. |
| 5,145,819 A | 9/1992 | Winter et al. |
| 5,153,157 A | 10/1992 | Hlatky et al. |
| 5,198,401 A | 3/1993 | Turner et al. |
| 5,239,022 A | 8/1993 | Winter et al. |
| 5,243,001 A | 9/1993 | Winter et al. |
| 5,276,208 A | 1/1994 | Winter et al. |
| 5,290,886 A | 3/1994 | Ellul |
| 5,296,434 A | 3/1994 | Karl et al. |
| 5,304,614 A | 4/1994 | Winter et al. |
| 5,329,033 A | 7/1994 | Apaleck et al. |
| 5,374,752 A | 12/1994 | Winter et al. |
| 5,397,832 A | 3/1995 | Ellul |
| 5,510,502 A | 4/1996 | Sugano et al. |
| 5,594,080 A | 1/1997 | Waymouth et al. |
| 5,672,668 A | 9/1997 | Winter et al. |
| 6,077,907 A | 6/2000 | Raetzsch et al. ............ 525/191 |
| 6,218,474 B1 * | 4/2001 | Valligny et al. ............ 264/302 |
| 6,294,611 B1 * | 9/2001 | Takayanagi et al. ........ 525/191 |

OTHER PUBLICATIONS

"Two–State Propagation Mechanism for Propylene Polymerization Catalyzed by rec–[anti–Ethylidene(–1–$\eta^5$–tetramethylcyclopentadienyl)(1–$\eta^5$–indenyl)] dimethyltitanium", Chien, et al, Journal of American Chemical Society, vol. 113, No. 22, p. 8569–8570, Oct. 23, 1991.

"Stereoblock Polypropylene: Ligand Effects on the Stereospecificity of 2–Arylindene Zirconocene Catalyst", Hauptman, et al, Journal of the American Chemical Society, vol. 117, No. 46, p. 11586–11587, Nov., 22, 1995.

"Elastomeric Poly(propylene): Influence of Catalyst Structure and Polymerization Conditions on Polymer Structure and Properties" Gauthier, et al, Macromolecules, vol. 28, No. 11, p. 3771–3778, May 22, 1995.

"Modeling Nonheme Diiron Enzymes: Hydrocarbon Hydroxylation and Desaturation by a High–Valent $Fe_2O_2$ Diamond Core", Kim, et al, Journal of the Americaan Chemical Society, vol. 119, No. 15, p. 3635–3636, Apr. 16, 1997.

* cited by examiner

ELASTIC FILMS INCLUDING CRYSTALLINE POLYMER AND CRYSTALLIZABLE POLYMERS OF PROPYLENE

RELATED APPLICATIONS

This application claims priority to and full incorporates by reference U.S. patent application Ser. No. 60/133,966, filed May 13, 1999.

FIELD OF THE INVENTION

The invention relates to elastic films comprising at least one and preferably two polyolefin thermoplastic components.

BACKGROUND

Ethylene—propylene copolymers and blends of isotactic polypropylene and ethylene propylene rubber are well known in the prior art. However, the traditional Ziegler-Natta catalysts used to make the ethylene propylene elastomer have limitations. Thus polymers which are simultaneously uniform in compositional distribution, have substantially stereospecific propylene residues and have less than 35 wt. % ethylene are not available with these catalysts. These limitations in the synthesis have lead to the absence of elastic films from blends of ethylene propylene copolymers and isotactic polypropylene.

U.S. Pat. No. 3,882,197 describes blends of stereoregular propylene/alpha-olefin copolymers, stereoregular propylene, and ethylene copolymer rubbers.

U.S. Pat. No. 3,888,949 suggests the synthesis of blend compositions containing isotactic polypropylene and copolymers of propylene and an alpha-olefin, containing between 6–20 carbon atoms, which have improved elongation and tensile strength over either the copolymer or isotactic polypropylene. Copolymers of propylene and alpha-olefin are described wherein the alpha-olefin is hexene, octene or dodecene. However, the copolymer is made with a heterogeneous titanium catalyst resulting in copolymers with non-uniform composition distribution and a broad molecular weight distribution. Non-uniform intramolecular compositional distribution is evident in U.S. Pat. No. 3,888,949 by the use of the term "block" in the description of the polymer where the copolymer is described as having "sequences of different alpha-olefin content." Within the context of the invention described above the term sequences describes a number of olefin monomer residues linked together by chemical formed during polymerization.

U.S. Pat. Nos. 4,461,872, improved on the properties of the blends described in 3,888,949 by using another heterogeneous catalyst system which is expected to form copolymers which have statistically significant intermolecular and intramolecular compositional differences.

Two successive publications in the journal of Macromolecules, 1989, V22, pages 3851–3866, described blends of isotactic polypropylene and partially atactic polypropylene which purportedly have desirable tensile elongation properties. However, the partially atactic propylene has a broad molecular weight distribution as shown in FIG. 8 of the first publication. The partially atactic polypropylene is also composed of several fractions, which differ in the level of tacticity of the propylene units as shown by the differences in the solubility in different solvents. This is shown by the corresponding physical decomposition of the blend which is separated by extraction with different solvents to yield individual components of uniform solubility characteristics as shown in Table IV of the above publications.

More recently several authors have shown the formation of more refined structures of partially atactic, partially isotactic polypropylene which have elastomeric properties. It is believed that in these components each molecule consists of portions which are isotactic and therefore crystallizable while the other portions of the same polypropylene molecule are atactic and therefore amorphous and not crystalllizable. Examples of these propylene homopolymers containing different levels of isotacticity in different portions of the molecule are described in U.S. Pat. No. 5,594,080, in the article in the Journal American Chemical Society (1995), 117, p. 11586; in the article in the Journal American Chemical Society (1997), 119, p. 3635; in the journal article in the Journal of the American Chemical Society (1991), 113, pp. 8569–8570, and in the journal article in the Journal Macromolecules (1995) 28, pp. 3771–3778. These articles describe the copolymer of the present composition but do not describe the compositions obtained in blends with a more crystalline polymer such as isotactic polypropylene, nor its resultant desirable physical properties.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene. The copolymers of this invention are necessarily heterogeneous in intermolecular and intramolecular composition distribution. This is demonstrated by the synthesis procedures of these copolymers which involve sequential injection of monomer mixtures of different compositions to synthesize polymeric portions of analogously different compositions. In addition, FIG. 1 of both patents shows that the "stereo block" character, which is intra or intermolecular compositional differences in the context of the description of the present invention, is essential to the benefit of the tensile and elongation properties of the blend of these patents.

Moreover, all of these compositions either do not meet all of the desired properties for various applications.

Similar results are purportedly achieved in U.S. Pat. No. 3,262,992 wherein the authors suggest that the addition of a stereoblock copolymer of ethylene and propylene to isotactic polypropylene leads to improved mechanical properties of the blend compared to isotactic polypropylene alone. However, these benefits are described only for the stereoblock copolymers of ethylene and propylene. These copolymers were synthesized by changing the monomer concentrations in the reactor with time. This is shown in examples 1 and 2. The stereoblock character of the polymer is graphically shown in the molecular description (column 2, line 65) and contrasted with the undesirable random copolymer (column 2, line 60).

The presence of stereoblock character in these polymers is shown by the high melting point of these polymers and the poor solubility in hydrocarbons at ambient temperature.

Notwithstanding these descriptions of the polymer blends containing isotactic propylene segments it is apparent that useful articles such as elastic films have not been constructed from any of these materials. The utility of elastic films is that they (a) are soft to the touch, (b) can recover from temporary tensile deformation to essentially their original dimensions, this latter property may be of advantage in disposable garments to aid in retaining their shape. In addition, there is a need for elastic films which are easily processible in conventional thermoplastic plastics film equipment using conditions similar to that used for conventional thermoplastic films. Further, any or all of the conventional processes used for film fabrication should be usable to fabricate the elastic film blend. These include but are not limited to the following: compression molding, blown film extrusion and cast film extrusion. It is also further desireable to have elastic films composed essentially completely of polyolefins such that they are thermally stable, heat resistant, light resistant and generally suitable for thermoplastic applications.

SUMMARY

There is a need therefore for elastic films composed generally completely of polyolefins but having simultaneously a crystalline stereospecific polypropylene component to obtain good tensile strength as well as a crystallizable ethylene-propylene copolymer to provide good elastic recoverability, resistance to elastic flow at a load sustained for specified period, as well as a glass transition temperature below that of polypropylene.

Embodiments of our invention include forming elastic films from predominantly crystallizable, semicrystalline polyolefin polymers. Further, embodiments include improving the aforementioned properties of films by blending a generally minor amount of a crystalline polyolefin where the type of crystallinity of the two components are similar, as for instance both will be substantially isotactic or syndiotactic, but the amount of crystallinity differs. Isotactic and syndiotactic arrangement of monomers in a polymer are defined in "Principles of Polymerization" by G. Odian ($3^{rd}$ Ed), 1991, p. 607 (John Wiley) which is incorporated herein by reference. Substantially pertains to an arrangement of monomer units where greater than 50% of adjacent monomer units have the defined tacticity. Other embodiments of our invention are directed to polyolefins and polyolefin blends where the crystallizable and crystalline components have a stereoregular polypropylene component, especially preferred is isotactic polypropylene. A crystalline polymer is one with a heat of fusion, a measured by Differential Scanning Calorimetry (DSC) to be greater than 50 J/g. A crystallizable polymer is one with a heat of fusion, as measure by DSC, to be less than 50 J/g. In the semicrystalline, crystallizable polymer this is achieved with a crystallizable copolymer of propylene and a $C_2$, $C_3$–$C_{20}$ alpha-olefin, preferably propylene and at least one other alpha-olefin having less than 6 carbon atoms, and more preferably propylene and ethylene. Improvements in the properties of the semicrystalline, crystallizable copolymer can be obtained by blending it with the crystalline stereoregular polypropylene component, particularly isotactic polypropylene. This crystallizable copolymer is less crystalline than the crystalline isotactic polypropylene. In the crystallizable copolymer the propylene is polymerized substantially stereospecifically. Preferably, the crystallizable copolymer is an ethylene propylene crystallizable copolymer, e.g., ethylene propylene elastomer that is thermoplastic. The crystallizable copolymer has a substantially uniform composition distribution, preferably as a result of polymerization with a metallocene catalyst. Composition distribution is a property of these crystallizable copolymers indicating a statistically significant intermolecular or intramolecular difference in the composition of the polymer. Methods for measuring compositional distribution are described later.

We have found that a crystallizable, semicrystalline propylene alpha olefin crystallizable copolymer, hereinafter referred to as the "first polymer component" (FPC) can be used to make elastic films. The properties of the film can be improved by blending an amount of a crystalline propylene polymer, hereinafter referred to as the "second polymer component", (SPC). These blends have the advantageous processing characteristics while still providing a composition having decreased flexural modulus and increased adjusted or normalized load capacity and low values of set and load decay. The decrease in set and load decay refer to the ability of the elastic film to withstand instantaneous and sustained loads, respectively, without substantial deformation. These improvements are most apparent as a function of the 200% tensile modulus (designated as load in the data below) of the blend. Historically, the examples of the prior art have been able to duplicate the improvements in the blend but only for compositions with a very low 200% tensile modulus.

It is possible to have a third polymeric component which is another crystallizable propylene alpha olefin copolymer indicated as FPC2 in the text below, which has crystallinity intermediate between the FPC and the SPC. The FPC2 also has a narrow composition distribution and is made with a metallocene catalyst. The addition of FPC2 leads to a finer morphology of dispersion of the FPC and improvements in some of the properties of the blend of FPC and SPC. In addition, these blends for elastic films may contain non-polymeric ingredients such as process oil, inorganic components such as particulate fillers such as carbon black, mica or calcium carbonate.

The term "crystalline," as used herein for SPC, characterizes those polymers which possess high degrees of inter- and intra-molecular order.

FPC2 describes those polymers or sequences which are substantially crystalline in the undeformed state (however, less crystalline than the SPC). Further crystallization may also occur in the presence of the crystalline polymer such as SPC.

The blends and the films made therefrom, contain a continuous phase of low crystallinity. For blends containing at least two polymeric components, an additional dispersed phase of greater crystallinity is also present. In this latter case the sizes of the individual domains of the dispersed phase are very small with the smallest length dimension for the dispersed phase being less than 5 $\mu$m. This phase size of the dispersed phase is maintained during processing even without crosslinking. The dispersed phase consists of a crystalline mixture of SPC with some amount of FPC2 (when present in the blend) and FPC, due to thermodynamic mixing of polymers. The continuous phase consists of the balance of the polymers not included in the dispersed phase. Blends directed to low flexural modulus may have in addition, a heterogeneous phase morphology with continuous phases of lower and greater crystallinity.

Commonly available reactor copolymer consisting of a single phase blend of isotactic polypropylene and copolymers of propylene and ethylene are not included within the scope of the present invention since they are a single phase with no prominent dispersed or continuos phases. Impact copolymer, thermoplastic olefins and thermoplastic elastomers have heterophase morphology made by a combination of a SPC and a FPC of the present invention. However, the more crystalline polymer is the continues phase in these blends and they are excluded from the present invention. The components of the blend in both cases are also compatible to the extent that no preformed or insitu formed compatibilizer needs to be added to attain and retain this fine morphology. Furthermore, embodiments of this invention describe improving the mechanical deformation recoverability of the aforementioned blends by annealing the blends and/or mechanically orienting the films formed from these blends.

The films made from these blends are made either by casting, compression molding or blowing films or by any of the other procedures known in the art. Typically, these films are between 0.1 to $100 \times 10^{-3}$ inch in thickness.

A preferred composition for the formation of the elastic films comprises 0%–95% by weight, preferably 2%–30% by weight and more preferably 2%–25% by weight of SPC and the balance of the composition being the FPC. The FPC comprising a crystallizable copolymer of the FPC of the invention, has isotactically crystallizable propylene sequences with a crystallinity less than 40 J/g and greater than 65% by weight propylene and preferably greater than 80% by weight propylene.

According to another embodiment, a thermoplastic polymer blend for the preparation of the elastic film composition of the invention comprises a SPC and a FPC with added process oil. The SPC comprises isotactic polypropylene, a reactor copolymer or an impact copolymer as described above. The balance of the polymer blend composition may consist of a mixture of the process oil and the FPC and FPC2 if used.

Still further embodiments of our invention are directed to a process for preparing thermoplastic blends suitable for the preparation of elastic films is contemplated. The process comprises: (a) polymerizing propylene or a mixture of propylene and one or more monomers selected from $C_2$ or $C_3$–$C_{20}$ alpha olefins in the presence of a polymerization catalyst wherein a substantially isotactic propylene polymer containing at least 90% by weight polymerized propylene is obtained; (b) polymerizing a mixture of ethylene and propylene in the presence of a chiral metallocene catalyst, wherein a crystallizable copolymer of ethylene and propylene is obtained comprising up to 35% by weight ethylene and preferably up to 20% by weight ethylene and containing isotactically crystallizable propylene sequences; and (c) blending the propylene polymer of step (a) with the crystallizable copolymer of step (b) to form a blend. Prochiral catalysts suitable for the preparation of crystalline and semi-crystalline polypropylene copolymers include those described in U.S. Pat. Nos. 5,145,819; 5,304,614; 5,243,001; 5,239,022; 5,329,033; 5,296,434; 5,276,208; 5,672,668; 5,304,614; and 5,374,752; and EP 549 900 and 576 970, all incorporated herein by reference. Additionally, metallocenes such as those described in U.S. Pat. No. 5,510,502 (incorporated herein by reference) are suitable for use in this invention.

According to still a further embodiment, the invention is directed to a process for preparing of elastic films from these thermoplastic polymer blends. The process comprises: (a) generating the thermoplastic blend (as described immediately above), (b) forming the elastic film by casting, blowing or compression molding as described in the art, (c) annealing the resulting films for a period of time less than 20 days at a temperature not to exceed 170° C. and (d) orienting the film either uniaxially or biaxially by extension to not greater than 700% of its original dimension. The annealing and/or the orientation may be conducted in a single operation or as distinctive sequential operations.

Another embodiment includes a film including a blend of polymers, the film has excellent resistance to set and excellent resistance to load decay, the blend of polymers being substantially noncrosslinked, comprising a first polymer component (FPC), the FPC has:

i) a composition distribution such that at least 75 weight percent of the polymer is isolated in two adjacent soluble fractions, each of these fractions has a composition difference of no greater than 20% (relative) of the average weight percent ethylene content of the whole first polymer component;

ii) a melting point, as determined by differential scanning calorimeter (DSC) less than 105° C.;

iii) a heat of fusion less than 45 J/g;

iv) propylene and an alpha-olefin present in said FPC, wherein the alpha-olefin is present in the FPC from 4–35 weight percent, wherein the alpha-olefin is selected from the group consisting of ethylene and C4–C12 alpha-olefin, the propylene making up the balance of the FPC. The FPC is present in the blend in the range of from 5–100 weight percent.

Also included is a second polymer component (SPC), the SPC being crystalline polymer having:

i) a melting point above 115° C.;

ii) a heat of fusion above 60 J/g;

iii) propylene present at least 90 weight percent, and an alpha-olefin present at less than 9 weight percent, wherein the total of the propylene and the alpha-olefin in the SPC adds to 100 weight percent;

the SPC being present in the blend in the range of from 0–95 weight percent;

wherein the film exhibits a resistance to set equal to or less than that described by the equation:

Set=7+[9/1000]× Adjusted Load ($L2$);

and wherein the film exhibits a load decay that is equal to or less than 20%.

These and other features, aspects and advantages of the present invention will become better understood with reference to the following description and appended claims.

DETAILED DESCRIPTION

Figure 1:
FIG. 1 is a composition of the invention blend comprising 78% of FPC and the balance of SPC.

The soft elastic film compositions of embodiments of our invention generally are comprised of a crystallizable FPC comprising an alpha-olefin (other than propylene) and propylene copolymer. Softness is generally indicated by flexural modulus, where for the instant films the values of flexural modulus less than 60 kpsi-inch/inch, more preferably less than 30 kpsi in/in and more preferably less than 15 kpsi in/in are preferred. A particular embodiment of the invention is the addition of a crystalline SPC comprising isotactic polypropylene to the FPC. A particular embodiment of the invention contains a crystallizable FPC2 comprising an alpha-olefin (other than propylene) and propylene copolymer. A particular embodiment of the invention may comprise an additional component, a process oil.

The First Polymer Component (FPC)

The FPC of the polymer blend compositions of the present invention comprises a crystallizable copolymer of propylene and another alpha-olefin having less than 10 carbon atoms, preferably ethylene. The crystallinity of the FPC arises from crystallizable stereoregular propylene sequences. The FPC has the following characteristics:

(A) The FPC of the present invention preferably comprises a random crystallizable copolymer having a narrow compositional distribution. The term "crystallizable," as used herein for FPC, describes those polymers or sequences which are mainly amorphous in the undeformed state, but can crystallize upon stretching, annealing or in the presence of a crystalline polymer. Crystallization is measured by DSC, as described herein. While not meant to be limited thereby, it is believed that the narrow composition distribution of the first polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as a one or two adjacent, soluble fraction with the balance of the polymer in immediately preceding or succeeding fractions. Each of these fractions has a composition (wt. % ethylene content) with a difference of no greater than 20 wt. % (relative) and more preferably 10 wt. % (relative) of the average wt. % ethylene content of the whole first polymer component. The first polymer component is narrow in compositional distribution if it meets the fractionation test outlined above.

(B) In all FPC, the length and distribution of stereoregular propylene sequences is consistent with the substantially random statistical crystallizable copolymerization. It is well known that sequence length and distribution are related to the copolymerization reactivity ratios. By substantially random, we mean copolymer for which the product of the reactivity ratios is generally 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C—13 NMR which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of the first polymer component.

(C) The FPC preferably has a single broad melting transition. This is determined by DSC. Typically a sample of the FPC will show secondary melting peaks adjacent to principal peak these are considered together as single melting point. The highest of these peaks is considered the melting point. These FPC polymers have a melting point of less than 105° C., preferably less than 100° C. and a heat of fusion of less than 45 J/g preferably less than 35 J/g, more preferably less than 25 J/g, as determined by DSC.

Generally, the FPC of the present invention has a melting point below the second polymer component of the blend between 105° C. and 0° C. Preferably, the melting point of FPC is between 90° C. and 20° C. Most preferably, according to one embodiment of the present invention, the melting point of the FPC of the composition of the present invention is between 70° C. and 25° C.

(D) The FPC of the present inventive composition comprises isotactically crystallizable alpha-olefin sequences, e.g., preferably propylene sequences (NMR). The crystallinity of the first polymer component is, preferably, according to one embodiment, from 1% to 65% of homoisotactic polypropylene, preferably between 3% to 30%, as measured by the heat of fusion of annealed samples of the polymer.

(E) The weight average molecular weight of the FPC can be between 10,000 to 5,000,000 preferably 80,000 to 500,000 with an poly dispersity index (PDI) between 1.5 to 40.0, more preferably between about 1.8 to 5 and most preferably between 1.8 to 3. It is preferred if the FPC has a ML (1+4)@ 125° C. less than 100, more preferably less than 75 and more preferably less than 60.

(F) The low levels of crystallinity in the FPC are obtained by incorporating from 5%–40% by weight alpha-olefin, preferably from 6%–30% by weight alpha-olefin, and most preferably, it comprises from 8%–25% by weight alpha-olefin and even more preferably between 8%–20%, most preferably between 10%–15% by weight alpha-olefin. These composition ranges for the FPC are dictated by the object of the present invention. Alpha olefins comprise one or more members of the group $C_2$, $C_3$–$C_{20}$ alpha-olefin. At alpha-olefin compositions lower than the above lower limits for the composition of the FPC, the blends of the SPC and FPC are thermoplastic and do not have the phase separated morphology required for the tensile recovery properties of the blends. At alpha-olefin compositions higher than the above higher limits for the FPC, the blends have poor tensile strength and a phase separated morphology with a coarse dispersion. It is believed, while not meant to be limited thereby, the FPC needs to have the optimum amount of isotactic polypropylene crystallinity to crystallize with the SPC for the beneficial effects of the present invention. As discussed above, the preferred alpha-olefin is ethylene.

(G) The compositions of the present invention may comprise from 5%–100% by weight of the FPC and from 0%–95% by weight of the SPC. Most preferably, they comprise from 30%–98% and even more preferably 60%–98% by weight of the FPC, most preferably 75%–98% by weight of the FPC. In blends containing the FPC2 the amount of the FPC2 is included in FPC fraction for the ratios of the relative amounts of crystalline and crystallizable polymer.

(H) More than one FPC may be used in a single blend with a SPC. Each of the FPC is described above and the number of FPC in this embodiment generally is less than three and more preferably, two. The different FPC differ in their crystallinity. The less crystalline portion is the FPC while the more crystalline portion is the FPC2. The FPC2 has, preferably, according to one embodiment, from 20%–65%, preferably between 25%–65% of the crystallinity of homoisotactic polypropylene as measured by the heat of fusion of annealed samples of the polymer. These FPC2 polymers have a melting point of less than 115° C. or preferably less than 100° C. and a heat of fusion of less than 75 J/g, preferably less than 70 J/g , more preferably less than 65 J/g, as determined by DSC. The heat of fusion of all samples, including the individual FPC components, is measured by DSC, according to procedures described herein.

The FPC and the FPC2 may also differ in their molecular weight. In this embodiment of the invention the FPC and FPC2 differ in the amount of alpha-olefin present in each, consistent with the formation of the FPC of different crystallinity content. The preferred alpha-olefin is ethylene. The resultant morphology consists of a finer dispersion of the highly crystalline component with the continuous phase of the less crystalline phase. Such a morphology leads to in the elastic recovery properties of the blends.

The first polymer component may also comprise a crystallizable copolymer of atactic propylene and isotactic propylene. Such crystallizable homopolymers of propylene have been described in U.S. Pat. No. 5,594,080. Optionally, the first polymer component of the composition of the present invention may comprise a diene.

Generally, without limiting in any way the scope of the invention, one means for carrying out a process of the present invention for the production of the crystallizable copolymer FPC is as follows: (1) liquid propylene is introduced in a stirred-tank reactor, (2) the catalyst system is introduced via nozzles in either the vapor or liquid phase, (3) feed ethylene gas is introduced either into the vapor phase of the reactor, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process comprises a polymerization in the presence of a catalyst comprising a chiral bis (cyclopentadienyl) metal compound and either 1) a non-coordinating compatible anion activator, or 2) an alumoxane activator. An exemplary catalyst system is described in U.S. Pat. No. 5,198,401 which is herein incorporated by reference for purposes of U.S. practice. The alumoxane activator is preferably utilized in an amount to provide a molar aluminum to metallocene ratio of from 1:1 to 20,000:1 or more. The non-coordinating compatible anion activator is preferably utilized in an amount to provide a molar ratio of biscyclopentadienyl metal compound to non-coordinating anion of 10:1 to 1:1. The above polymerization reaction is conducted by reacting such monomers in the presence of such catalyst system at a temperature of from −50° C. to 200° C. for a time of from 1 second to 10 hours to produce a copolymer. While the process of embodiments of the present invention includes utilizing a catalyst system in the liquid phase (slurry, solution, suspension or bulk phase or combination thereof), gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well known additives such as, for example, scavengers. See, for example, U.S. Pat. No. 5,153,157 which is incorporated herein by reference for purposes of U.S. practice. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene crystallizable copolymer of the desired molecular weight and composition.

These stereoregular propylene sequences of FPC and FPC2 should match the stereoregularity of the propylene in the second polymer component (SPC). For example, if the SPC is predominately isotactic polypropylene, then the FPC, and FPC2 if used, is crystallizable copolymer having isotactic propylene sequences. If the SPC is predominately syndiotactic polypropylene, then the FPC, and the FPC2 if used, is a crystallizable copolymer having syndiotactic sequences. It is believed that this matching of stereoregularity increases the compatibility of the components results in improved adhesion of the domains of the polymers of different crystallinities in the polymer blend composition. Furthermore, good compatibility is only achieved in a narrow range of crystallizable copolymer composition for the FPC. Narrow intermolecular and intramolecular compositional distribution in the crystallizable copolymer is preferred. The aforementioned characteristics of the FPC, and FPC2 if used, are preferably achieved by polymerization with a chiral metallocene catalyst.

The FPC is made with a polymerization catalyst which forms essentially or substantially isotactic polypropylene. When all or substantially all propylene sequences in the SPC are isotactic. Nonetheless, the polymerization catalyst used for the formation of FPC will introduce stereo- and regio-errors in the incorporation of propylene. Stereo errors are those where the propylene inserts in the chain with a tacticity that is not isotactic. A regio error in one where the propylene inserts with the methylene group or the methyldiene group adjacent to a similar group in the propylene inserted immediately prior to it. Such errors are more prevalent after the introduction of an ethylene in the FPC. Thus the fraction of propylene in isotactic stereoregular sequences (e.g. triads or pentads) is less than 1 for FPC and decreases with increasing ethylene content of the FPC. While not wanting to be constrained by this theory, we suggest that the introduction of these errors in the introduction of propylene particularly in the presence of increasing amounts of ethylene are important in the use of these ethylene propylene copolymers as the FPC. Notwithstanding the presence of these errors the FPC is statistically random in the distribution of ethylene.

Preferably the FPC is a random crystallizable copolymer of ethylene and propylene having an average propylene content by weight of at least 60% and more preferably at least 75%.

According to another embodiment of the present invention, the first polymer component.(both FPC and FPC 2) may contain small quantities of a non-conjugated diene to aid in the vulcanization and other chemical modification of the blend of the first polymer component and the second polymer component. The amount of diene is preferably less than 10 wt. % and preferably less than 5 wt %. The diene may be selected from the group consisting of those which are used for the vulcanization of ethylene propylene rubbers and preferably ethylidene norbornene, vinyl norbornene and dicyclopentadiene.

The FPC2, if used, has the same characteristics as the FPC described above. The FPC2 has a crystallinity and composition intermediate between the SPC and the FPC. In the preferred case where the FPC2 is a crystallizable copolymer of ethylene and propylene while the SPC is homopolymer of propylene. The FPC2 has the same type of crystallinity of propylene as in SPC and FPC and an ethylene content in between SPC and FPC. If both SPC and FPC are composed of propylene of different levels of crystallinity the FPC2 is a propylene polymer with level of crystallinity intermediate between SPC and FPC. The relative amounts of FPC and FPC2 can vary between 95:5 to 50:50 in the blend. The ratio of the SPC to the sum of FPC and FPC2 may vary in the range of 1:99 to 95:5 by weight and more preferably in the range 2:98 to 70:30 by weight.

The present invention is directed to elastic films made from a FPC which is a crystallizable copolymer of a $C_2$, $C_3$–$C_{20}$ alpha-olefin (preferably ethylene). Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1. Elastic films having a heterophase morphology are made when blends of FPC and SPC where the where the SPC is predominately crystalline stereoregular polypropylene. Optional components of the blend are FPC2, a crystallizable copolymer of a $C_2$, $C_3$–$C_{20}$ alpha-olefin (preferably ethylene) and process oil. The invention includes the process for the formation of formation of elastic films from blends Other optional components are fillers, colorants, antioxidants, nucleators and flow improvers.

The Second Polymer Component (SPC)

In accordance with the present invention, the SPC component i.e., the polypropylene polymer component may be homopolypropylene, or a copolymer of propylene, or mixtures thereof. These mixtures are commonly known as reactor copolymer (RCP) or impact copolymer (ICP). The SPC has the following characteristics.

(A) The polypropylene of the present invention is predominately crystalline, i.e., it has a melting point generally greater than 110° C., preferably greater than 115° C., and most preferably greater than 130° C. It has a heat of fusion greater than 60 J/g preferably at least 70 J/g, more preferably at least 80 J/g, as determined by DSC analysis. Determination of this heat of fusion is influenced by treatment of samples. If treated as discussed below herein, the heat of fusion of this SPC will be a maximum of about 88 J/g.

(B) The polypropylene can vary widely in composition. For example, substantially isotactic polypropylene homopolymer or propylene copolymer containing equal to or less than 10 weight percent of other monomer, i.e., at least 90% by weight propylene can be used. Further, the polypropylene can be present in the form of a graft or block copolymer, in which the blocks of polypropylene have substantially the same stereoregularity as the propylene-alpha-olefin copolymer so long as the graft or block copolymer has a sharp melting point above 110° C. and preferably above 115° C. and more preferably above 130° C., characteristic of the stereoregular propylene sequences. The propylene polymer component may be a combination of homopolypropylene, and/or random, and/or block copolymers as described herein. When the above propylene. polymer component is a random copolymer, the percentage of the copolymerized alpha-olefin in the copolymer is, in general, up to 9% by weight, preferably 2% to 8% by weight, most preferably 2% to 6% by weight. The preferred alpha-olefins contain 2 or from 4 to 12 carbon atoms. The most preferred alpha-olefin is ethylene. One, or two or more alpha-olefins can be copolymerized with propylene.

Exemplary alpha-olefins may be selected from the group such as those disclosed above for the FPC.

(C) The molecular weight of the SPC can be between 10,000 to 5,000,000, preferably 50,000 to 500,000 with a poly dispersity index (PDI) between 1.5 to 40.0.

(D) The thermoplastic polymer blend compositions of the present invention may comprise from 0%–95% by weight of SPC. According to a preferred embodiment, the thermoplastic polymer blend composition of the present invention may comprise from 2%–70% by weight of the SPC. According to the most preferred embodiment, the compositions of the present invention may comprise from 2%–40% by weight of the SPC. An even more preferred embodiment of the invention contains 2%–25% by weight of SPC in the blend.

There is no particular limitation on the method for preparing this propylene polymer component of the invention. However, in general, the polymer is a propylene homopolymer obtained by homopolymerization of propylene in a single stage or multiple stage reactor. Copolymers may be obtained by copolymerizing propylene and an alpha-olefin having 2 or from 4 to 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The SPC may also be comprised of commonly available isotactic polypropylene compositions referred to as impact copolymer or reactor copolymer. However these variations in the identity of the SPC are acceptable in the blend only to the extent that all of the components of the SPC are substantially similar in composition and the SPC is within the limitations of the crystallinity and melting point indicated above. This SPC may also contain additives such as flow improvers, nucleators and antioxidants which are normally added to isotactic polypropylene to improve or retain properties. All of these polymers are referred to as the SPC.

Process Oil

Process oil can be optimally added to the polymer blend compositions of the present invention. The addition of process oil in moderate amounts lowers the viscosity and flexibility of the blend while improving the properties of the blend at temperatures near and below 0° C. It is believed that these benefits arise by the lowering of the Tg of the blend comprising the mixture of the SPC and the FPC. Additional benefits of adding process oil to the blend of the SPC and the FPC include improved processibilty and a better balance of elastic and tensile strength are anticipated.

The process oil is typically known as extender oil in the rubber application practice. The process oils can consist of (a) hydrocarbons consisting of essentially of carbon and hydrogen with traces of hetero atoms such as oxygen or (b) essentially of carbon, hydrogen and at least one hetero atom such as dioctyl phthalate, ethers and polyethers. The process oils have a boiling point to be substantially involatile at 200° C. These process oils are commonly available either as neat solids or liquids or as physically absorbed mixtures of these materials on an inert support (e.g. clays, silica) to form a free flowing powder. We believe that all forms of these process oils are equally applicable to the description and the practice of the invention.

The process oils usually include a mixture of a large number of chemical compounds which may consist of linear, acyclic but branched, cyclic and aromatic carbonaceous structures. Another family of process oils are certain low to medium molecular weight (Molecular weight ($M_n$)<10,000) organic esters and alkyl ether esters. Examples of process oils are Sunpar® 150 and 220 from The Sun Manufacturing Company of Marcus Hook, Pa., USA and Hyprene® V750 and Hyprene V1200 from Ergon, Post Office Box 1639, Jackson, Miss. 39215–1639, U.S.A. and IRM 903 from Calumet Lubricants Co., 10234 Highway 157, Princeton, La. 71067–9172, U.S.A. It is also anticipated that combinations of process oils each of which is described above may be used in the practice of the invention. It is important that in the selection of the process oil be compatible or miscible with the polymer blend composition of the SPC and the FPC in the melt to form a homogenous one phase blend. It is also preferred if the process oil is substantially miscible in the FPC at room temperature.

The addition of the process oils to the mixture comprising the SPC and the FPC maybe made by any of the conventional means known to the art. These include the addition of all or part of the process oil prior to recovery of the polymer as well as addition of the process oil, in whole or in part, to the polymer as a part of a compounding for the interblending of the SPC and the FPC. The compounding step may be carried out in a batch mixer such as a mill or a internal mixer such as Banbury mixer. The compounding operation may also be conducted in a continues process such as a twin screw extruder.

The addition of certain process oils to lower the glass transition temperature of blends of isotactic polypropylene and ethylene propylene diene rubber has been described in the art in U.S. Pat. Nos. 5,290,886 and 5,397,832. We expect these procedures are easily applicable to the SPC and FPC mixtures of the current invention.

The SPC and FPC blend may include process oil in the range of from 1 to 50, preferably in the range of from 2 to 20 parts by weight of process oil per hundred parts of total polymer (SPC plus FPC).

The Blend of First and Second Polymer Components

The blends of SPC and FPC and other components may be prepared by any procedure that guarantees an intimate mixture of the components. For example, the components can be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. A complete mixture of the polymeric components is indicated by the uniformity of the morphology of the dispersion of SPC and FPC. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

The polymer blends of the instant invention exhibit a remarkable combination of desirable physical properties. The incorporation of as little as 5% SPC in the FPC, increases the melting point of the blend. In addition, the incorporation of SPC in accordance with the instant invention nearly eliminates the stickiness characteristic of the propylene/alpha-olefin crystallizable copolymer alone.

The mechanism by which the desirable characteristics of the present copolymer blends are obtained is not fully understood. However, it is believed to involve a co-crystallization phenomenon between propylene sequences of similar stereoregularity in the various polymeric components, which results in a merging of the crystallization temperature of the latent components. Applicants do not wish to be bound by this theory. The combined first polymer component and second polymer component have a blend melting point closer together than would be expected on a comparison of the properties of the individual components alone. Surprisingly, some blend compositions have a single crystallization temperature and a single melting temperature, since it would be expected by those skilled in the art that blending a crystalline polymer and a crystallizable polymer would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/alpha-olefin crystallizable copolymer, thus measurably increasing its commercial utility and range of applications.

While the above discussion has been limited to the description of the invention in relation to having only components one and two (e.g. FPC and SPC), as will be evident to those skilled in the art, the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives which may be employed to enhance properties include antiblocking agents, and a coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

Morphology of the Blend

It is important to note that the morphology of the inventive blends differs markedly from the morphology of both thermoplastic elastomers (TPE) and thermoplastic olefins (TPO), both terms well known to those of ordinary skill in this art. Specifically, both TPEs and TPOs show continuous phases of crystalline morphology, with discontinuous phase of amorphous phase. By contrast, the inventive blends show the reverse, a continuous phase of amorphous or crystallizable morphology, and a discontinuous phase of the crystalline morphology.

The morphology of the blend is shown in Transmission Electron Microscopy of the blends. In this procedure samples were exposed to vapors of 1% aqueous $RuO_4$ for 3 days. The $RuO_4$ penetrates the amorphous zones of the continuous, less crystalline phase of the polymer while the more crystalline domains composed largely of the SPC are essentially unaffected. Within the continuous zone the $RuO_4$ stained the microzones of amorphous polymer while the lamellae of crystalline polymer are visible by contrast. The blend was cryomicrotomed at −196° C. to thin sections approximately 0.3 to 3 μm thick. Several sections were analyzed for each sample until a section was found where the crystalline domains was unstained while the continuous phase was stained to distinguish it from the dispersed phase and to observe the microstructure of the lamellae of polymer.

Figure 2:
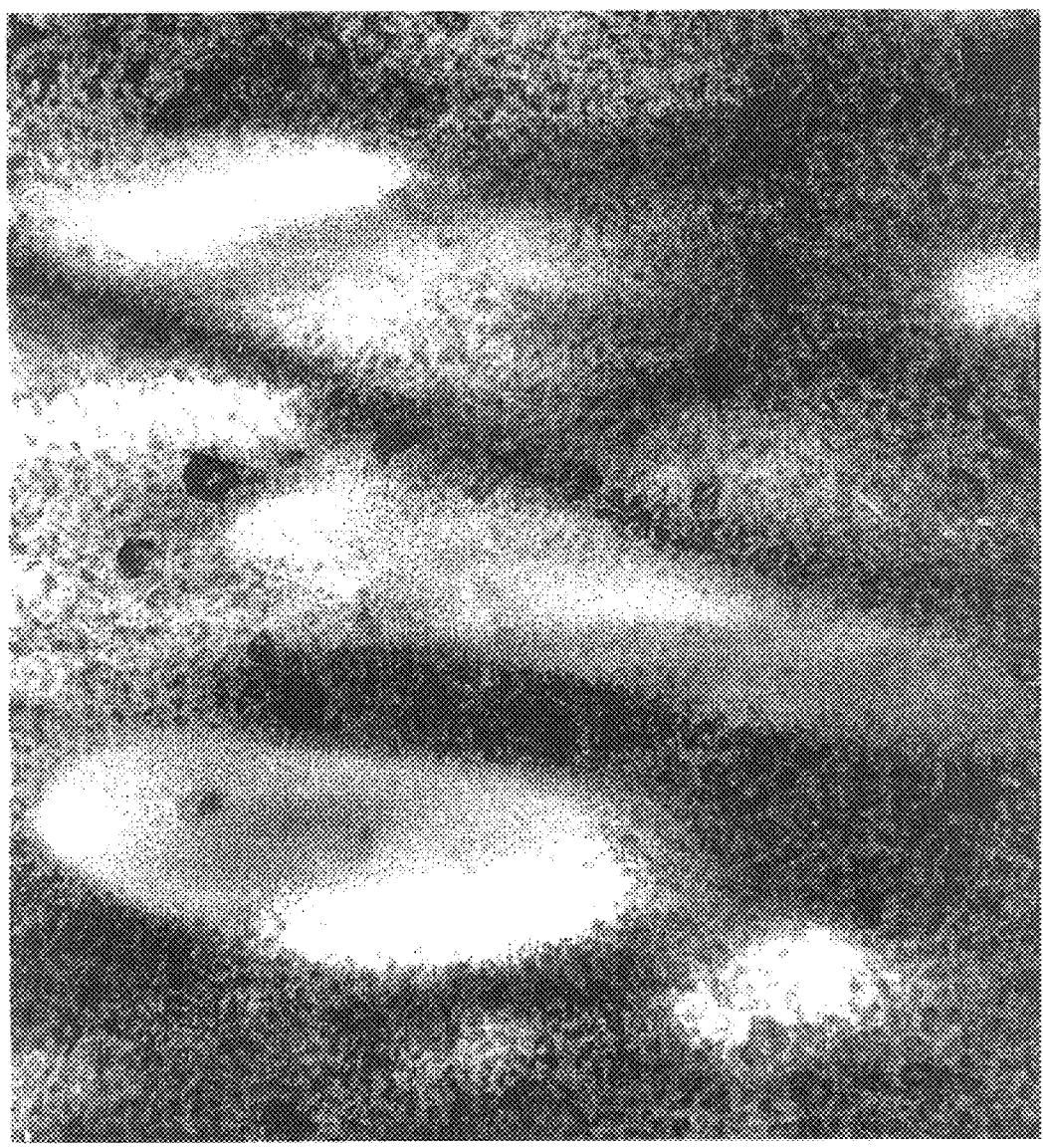
FIG. 2 shows a different blend of the invention, containing 78% of another FPC of a different composition.
Figure 3:
FIG. 3 illustrates the addition of FPC2 to the blend of FIG. 2.

The blends of the current invention with good elastic recovery from tensile deformation had a microstructure with clearly dispersed microdomains of the crystalline phase. This is shown in FIG. 1. The composition of the blend is 78% of FPC and the balance of SPC. The domains are elongated with approximate dimensions of 0.2 μm×1 μm. FIG. 2 shows a different blend of the invention, containing 78% of another FPC of a different composition. In FIG. 2 the dispersed phase has dimensions of 0.6 μm×2.0 μm. The addition of FPC2 to this blend of FIG. 2 is shown in the micrograph FIG. 3. It shows the reduction in the size of the dispersed phase to elongated particles having 0.2 μm for each dimension. FPC2 is therefore believed to act as an agent for reducing the size of the dispersion of the crystalline phases in the dispersed continuous phase. This is the morphological effect of adding FPC2 to the blend of a SPC and FPC.

Film Preparation

Film from the above discussed blend may be manufactured by conventional tubular extrusion, (blown bubble process) or by cast extrusion, with the latter being preferred. In the cast extrusion process, the molten resin is extruded from an elongate die to the form of a web. The web is cast onto a chill roller, which solidifies the polymer, and finally the web is wound into a roll.

The extrusion temperatures, die temperatures, and chill roll temperatures will depend on the composition employed, but generally will be in the following ranges for the compositions of the present invention prepared by cast extrusion:

| | |
|---|---|
| Melt Temperature (° F.) | 350–450 |
| Die Temperature (° F.) | 350–450 |
| Chill Roll Temperature (° F.) | 70–130 |

The process described above may also include a set of embossing rolls to chill and form the film.

Films of the blend for purposes of exemplification were made both by casting as well as by compression molding using a spacer to obtain the appropriate thickness. A 30 g sample of the blend is compression molded at 180° C. to 200° C. for 15 minutes at a force of 25 tons into a plaque of dimensions of 11 in×11 in. The film is compression molded between sheets of Teflon® covered aluminum foil and cooled under compression to room temperature for 15 minutes prior to removal. A Mylar® spacer with thickness of 4/1000 inch is used to ensure uniform thickness across the film. The film averaged 7/1000 to 11/1000 inch thick. The films are annealed for 7 days at room temperature prior to testing for elastic properties.

Films are often made with a coextruded soft or thermoplastic layer adhered to one or both side of the inventive film. The layers are adhered by a process of coextrusion of the film with the layer. In these coextruded films the individual layers are different in composition and retain their composition except at the interface layer. These layers may be either a soft material such as an ethylene propylene copolymer elastomer which is intended to reduce the adhesive sticky feel of the inventive film, or more commonly a thermoplastic. The thermoplastic layer for extrusion can have several intents. First, it can be a mechanical support for the elastic film to prevent sag. Second, it can be barrier to adhesion of the polymer film to other surfaces. Third, the thermoplastic layer can become a part of the integral use of the elastic film in that the composite film is stretched beyond the yield point of the thermoplastic layer (typically>50% elongation) and allowed to retract due to the elastic forces of the elastic core film. In this operation thermoplastic film is wrinkled to lead to a desirable surface finish of the composite elastic film. A particularly suitable thermoplastic for this operation is polypropylene while polyethylene is also suitable.

There are many detailed procedures in the formation of cast film which are included within the subsequent discussion of cast film or the process of casting films. Casting of the films may be by calendering the film between a chilled steel roller to rapidly cool it or by a continuous air cooling for a slower cooling. The dimension of the film may be controlled by using a air knife or by using a rubber nip roller to simultaneously emboss it with a distinctive pattern on one or both sides. These and other procedures known to those skilled in the art of production of elastic films are included in our definition of cast films.

Orientation and Annealing

Another part of the invention is that the mechanical properties referred to above can be enhanced by the mechanical orientation of the polymer film. Mechanical orientation can be done by the temporary, forced extension of the polymer film along one or more axis for a short period of time before it is allowed to relax in the absence of the extensional forces. It is believed that the mechanical orientation of the polymer leads to reorientation of the crystallizable portions of the blend of the first and the second polymer. Oriented polymer films are conducted by maintaining the polymer films or the articles made from a such a blend at an extension of 10% to 400% for a period of 0.1 seconds to 24 hours. A typical orientation is an extension of 200% for a momentary period (generally less than 1 minute) at room temperature.

Annealing and orientation of the blend of the SPC and FPC lead to improvement in the tensile recovery properties of the blend. This is shown in the data in Tables below where the set recovery values for the blends described in the invention are described for the blends as made, after annealing and after orientation as described in the procedures above. The data show that the elastic recovery properties are enhanced after one or both of these treatments.

Orientation of the film may be carried out in the machine direction (MD) or the transverse direction (TD) or both directions (biaxially ) using conventional equipment and processes.

For orientation in the MD, a polymeric film at an elevated temperature (but below the crystalline melting point of the polymer) is passed from a feed roll of film around two rollers driven at different surface speeds and finally to a take-up roller. The driven roller closest to the take-up roll is driven faster than the driven roller closest to the feed roll, such that the film is stretched between the driven rollers. The assembly may include a roller intermediate the second roller and take-up roller to cool the film. The second roller and the take-up roller may be driven at the same peripheral speeds to maintain the film in the stretched condition. If supplementary cooling is not used, the film will cool to ambient temperature on the take up roll.

The degree of stretch will depend upon the relative peripheral speeds of the driven rollers and the distance between the rollers. Stretch rates of 50 to 500 percent/minute will be satisfactory for most MD orientation applications.

Preferably, however, film orientation will be carried out in a tentering device to impart TD orientation to the film. The film is cast as described above or is unwound from a film roll and then gripped by the edges for processing through the orientation steps. The film is passed successively through a preheat step, a stretching step at elevated temperatures (e.g. from 100° F. to a temperature slightly below the crystalline melting point of the ethylene crystallizable copolymer), an annealing step, and finally a cooling step. (Although cooling may be considered part of the annealing step, for convenience it is described as a separate step herein). The preheat, orientation, and a portion of the annealing temperature is controlled at an elevated temperature, but below the crystalline melting point of the polymer. Although not essential, it is preferred that tension be maintained on the film during the annealing and cooling steps to minimize shrinkback. Upon cooling to ambient temperature (i.e., room temperature) or near ambient, the holding force may be released. The film may contract somewhat (snapback) in the TD but will retain substantial portion of its stretched length.

The tenter operating conditions can vary within relatively wide ranges and will depend on the several variables including film composition, film thickness, degree of orientation desired, annealing conditions, etc. The following is exemplary of a process for stretching 100 micron thick film (containing ethylene vinyl acetate) from 24 inches wide to a final width of 60 inches, using a tenter manufactured by Marshall and Williams Company of Providence, R.I.

As indicated earlier, it is highly desirable to employ an annealing step in the process. Annealing partially relieves the internal stress in the stretched film and dimensionally stabilizes the film for storage. It has been found that by annealing the film at a temperature of ±100° F., preferably ±50° F. of the orientation temperature (but slightly below the crystalline melting point of the SPC) is preferred. Annealing may be carried out in a time and temperature dependent relationship.

A particular recent innovation in orientation of the film is demonstrated by using a interdigitating grooved roller assembly to produce simultaneously a desirable crinkled surface finish as well as orient the film. Such a process is described in U.S. Pat. No. 4,368,565 incorporated by reference herein for purposes of U.S. patent practice. In this process the film is stretched between two interlocking grooved rollers which are able to both biaxially stretch the film and orient it.

Measurement of Film Properties

The stress-strain elongation properties of the insitu and the corresponding physical blends was evaluated using specimens removed from these film samples with a die. The stress strain evaluation of the samples was conducted on an Instron 4465, made by Instron Corporation of 100 Royall Street, Canton, Mass. The digital data was collected in a file collected by the Series IX Material Testing System available from Instron Corporation and analyzed.

The testing procedure for elongation and elasticity is the following:

1. The specimen is mounted on the Instron and elongated to 200% elongation. The load at this is measured to be L1.
2. The specimen is maintained at this extension for 30 seconds and the new load at the end of 30 seconds is L1(30).
3. The relaxation (R1) of the film is measured as 100× {L1−L1(30)}/L1 and is expressed as a percentage.
4. The specimen returned to the initial elongation of 0%.
5. The specimen is elongated to 200% elongation. The load at this is measured to be L2.
6. The specimen is maintained at this extension for 30 seconds and the new load at the end of 30 seconds is 12(30)
7. The relaxation (R2) of the film is measured as 100× {l2−l2(30)}/L2 and is expressed as a percentage.
8. The specimen returned to the initial elongation of 0%.
9. The elongation at which the load on the sample is zero on this second cycle is noted to be the Set %.
10. The Hysterisis in the sample is designated as 100* (L1−L2)/L1 in percent.

The testing procedure for the resistance to the stress decay is the following.

1. The specimen is mounted on the Instron and elongated to 25% extension.
2. The specimen is maintained at this extension for an extended period (e. g. 3–12 hours as below) of time and the load is measured at intervals of time, typically 10 to 1000 seconds. During this time the load slowly decreases.
3. After 3 to 12 hours the fractional loss in load is correlated to the logarithm of the time in seconds as a first order decay and the rate constant is specified as the Load Decay in percent.
4. The fit of the actual data to the Load Decay rate constant is calculated as the Root mean Square of the fit and is expressed as Decay (R2).

The analysis of the data from these series of experiments is normalized to account for the differences in the thickness of the films. The normalization procedure involves the following operations.

1. An accurately measured 10 centimeter by 10 centimeter square of the film is removed and weighed (W1) in grams.
2. The normalization factor of 2/W1 is calculated.
3. All of the load terms are multiplied by this normalization term in the data shown below. This normalization process only affects the load values while the data for the decay and set are unaffected. The load for the film is calculated as:

$$L2=(2/W1)*l2.$$

This is called the adjusted load (L2) in Table 4 and in subsequent discussion.

Properties of the Film: Elastic Recovery and Elastic Decay

Among the benefits of the above invention is that compositions comprising the SPC and the FPC containing optional amounts of process oil can be made which have excellent elastic recovery from tensile deformation. Table 4 shows the experimental data obtained for films of the inventive composition which have the inventive elastic recovery properties. Hysterisis and set are typically below 25% and more typically less than 15%.

The films made from the blends described herein will exhibit excellent, low set and simultaneously excellent decay. Specifically, the set will be described by an equation derived from plotting the data shown in tables 4, 4a, and 4b and in a plot of load set and load decay. The set will be equal to or less than that described by the equation:

$$\text{Set}=7+[9/1000]\times \text{Adjusted Load } (L2);$$

Preferably equal to or less than;

$$\text{Set}=7+[6/1000]\times \text{Adjusted Load }(L2);$$

more preferably equal to or less than;

$$\text{Set}=7+[3/1000]\times \text{Adjusted Load }(L2);$$

Where the load decay of the film must also, simultaneously be equal to or less than 20%, preferably equal to or less than 16%, more preferably equal to or less than 15%.

These values of the set over the range of composition of the SPC and FPC are dependent on the 200% adjusted load (L2). Elastic recovery of the blend is judged on three criteria: (a) extensibility to 200% elongation with a measurable load and (b) set from a extension to 200% elongation and (c) decay from extension to 25% elongation. In general elastic films of the present invention should have a low flexural modulus in order to have a soft film combined with a extended load range (L2) over which small values of set and decay are simultaneously obtained. Some comparative blends in the prior art can be extended to 200% elongation for the measurement of tensile modulus but have poor set from a 200% extension. Alternatively blends can be made in the prior art with good values of instantaneous set but poor values of decay due to poor ability to sustain load. The elastic blends of the current invention fulfill both of these conditions. Generally for all blends the set and the hystresis deteriorates with increase in the L2 adjusted load though there is an extended range of load range up to 2000 gms which have a favorable combination of properties. The blends of the current invention have better elastic recovery, as indicated by low set, than comparative blends at comparable 200% extension. These properties are available over a wide range of composition and relative amounts of the SPC and the FPC. In the examples shown below we show examples of numerous blends of composition of the SPC and the FPC which have the above favorable combination of properties.

It is possible to generate comparative polymer blends with some aspect of the combined load and set properties of the blends of this invention approached if the FPCs are of extremely high molecular weight and in the limit crosslinked. Such a combination would lead to blends which had very poor processing characteristics since they would tend to melt fracture. It is understood that polymer blends of embodiments of the present invention are directed to easy processing materials which can be handled in conventional thermoplastics processing machinery.

Another part of the invention is that the elastic recovery referred above can be enhanced by the thermal annealing of the polymer films or by the orientation of articles made from these polymer films. Thermal annealing of the polymer blend is conducted by maintaining the polymer blends or the articles made from a such a blend at temperature between room temperature to a maximum of 160° C. or more preferably to a maximum of 130° C. for a period between 5 minutes to less than 7 days. A typical annealing period is 3 days at 50° C. or 5 minutes at 100° C. The annealing time and temperature can be adjusted for any particular blend composition comprising a SPC and one or two FPC by experimentation. It is believed that during this annealing process there are intermolecular rearrangement of the polymer chains leading to a material with much greater recovery from tensile deformation than the unannealed material.

Properties of the Blend: Flexural Modulus

Among the benefits of our invention are that blend compositions, and films made therefrom, comprising the SPC and the FPC containing optional amounts of process oil, can be made which have low flexural modulus, which is the property associated with softness. These blends have either dispersed or a cocontinuos crystalline phase dispersed in the continuous crystallizable phase. The crystalline phase contains the majority of the SPC and some of the FPC's due to thermodynamic mixing while the continuous phase consists of the balance of the polymer blend. Low flexural modulus is measured as the 1% secant modulus. The values of flexural modulus less than 60 kpsi-inch/inch, more preferably less than 30 kpsi in/in and more preferably less than 15 kpsi in/in are preferred.

The flexible blends of the current invention fulfill both of these conditions since they have low flexural modulus and low values of decay and set. Generally for all blends the flexural modulus deteriorates with increase in the 200% adjusted load. These properties are available over a wide range of composition and relative amounts of the SPC and the FPC. In the examples shown below we show examples of numerous blends of composition of the SPC and the FPC which have the above favorable combination of properties.

It is possible to generate comparative polymer blends with some aspect of the combined 200% load and the low flexural modulus of the blends of this invention if the FPCs are of extremely high molecular weight and in the limit crosslinked. Such a combination would lead to blends which had very poor processing characteristics since they would tend to melt fracture. It is understood that these polymer blends are directed to easy processing materials which can be handled in conventional thermoplastics processing machinery.

Determination of Properties

As used herein, Mooney Viscosity was measured as ML (1+4) at 125° C. in Mooney units according to ASTM D1646.

The composition of ethylene propylene copolymers, which are used as comparative examples, was measured as ethylene wt. % according to ASTM D 3900.

The composition of the first polymer component was measured as ethylene wt. % according to the following technique. A thin homogeneous film of the second polymer component, pressed at a temperature of or greater than 150° C. was mounted on a Perkin Elmer PE 1760 infra red spectrophotometer. A full spectrum of the sample from 600 cm−1 to 400 cm−1 was recorded and the ethylene wt. % of the second polymer component was calculated according to Equation 1 as follows:

$$\text{ethylene wt. \%}=82.585-111.987x+30.045x^2$$

wherein X is the ratio of the peak height at 1155 cm$^{-1}$ and peak height at either 722 cm$^{-1}$ or 732 cm$^{-1}$, which ever is higher.

Techniques for determining the molecular weight (Mn and Mw) and molecular weight distribution (MWD) are found in U.S. Pat. No. 4,540,753 (which is incorporated by reference herein for purposes of U.S. practice) and references cited therein and in Macromolecules, 1988, volume 21, p 3360 (which is herein incorporated by reference for purposes of U.S. practice) and references cited therein.

The procedure for Differential Scanning Calorimetry is described as follows. About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to −70° C. The sample is heated at 20° C./min to attain a final temperature of 200° C. to 220° C. The thermal output is recorded as the area under the melting peak of the sample which is typically peaked at 30° C. to 175° C. and occurs between the temperatures of 0° C. and 200° C. is measured in Joules as a measure of the heat of fusion. The melting point is recorded as the temperature of the greatest heat absorption within the range of melting of the sample. Under these conditions, the melting point of the second polymer component and the heat of fusion is lower than the first polymer component as outlined in the description above.

Composition distribution of the second polymer component was measured as described below. About 30 gms of the second polymer component was cut into small cubes ⅛" on the side. This is introduced into a thick walled glass bottle closed with screw cap along with 50 mg of Irganox1076, an antioxidant commercially available from Ciba—Geigy Corporation. Then, 425 ml of hexane (a principal mixture of normal and iso isomers) is added to the contents of the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at 31° C. for 24 hours in a covered circulating water bath. The soluble polymer is decanted and the additional amount of hexane is added for another 24 hours at 31° C. prior to decanting. In this manner, fractions of the second polymer component soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above 60° C. The soluble polymers are dried, weighed and analyzed for composition, as wt. % ethylene content, by the IR technique described above. Soluble fractions obtained in the adjacent temperature increases are the adjacent fractions in the specification above.

Comparative data was obtained with ethylene propylene rubber (EPR) which is Vistalon®457, sold by the Exxon Chemical Company, Houston Tex.

Blends were made by mixing a total of 72 g of all components, including the first polymer component, the second polymer component, the optional amounts of process oil and other ingredients in a Brabender intensive mixture for 3 minutes at a temperature controlled to be within 185° C. and 220° C. High shear roller blades were used for the mixing and approximately 0.4 g of Irganox–1076, an antioxidant available from the Novartis Corporation, was added to the blend. Samples were aged by allowing them to stand at room temperature prior to testing. Samples were aged for 5, 10, 15, 20 and 25 days prior to testing on the Instron. Significant difference in the tensile strength and tension set were observed between samples aged 1 days versus those aged for 5 or more days. There was no experimental difference between samples aged 5 days or longer.

Samples were oriented by momentarily extending them to 200% extension at room temperature. These oriented samples were retested under tensile testing conditions outlined above.

Flexural modulus was determined for samples of the blend by ASTM procedure D790 at room temperature.

Data analysis and mathematical model generation was done on Microsoft Excel. The invention, while not meant to be limited thereby, is further illustrated by the following specific examples:

EXAMPLES

Example 1

Ethylene/Propylene Copolymerization to Form the First Polymer Component.

Continuous Polymerization of the FPC was conducted in a 9 liter Continuous Flow Stirred Tank Reactor using hexane as the solvent. The liquid full reactor had a residence time of 9 minutes and the pressure was maintained at 700 kpa. A mixed feed of Hexane, ethylene and propylene was pre-chilled to approximately −30° C. to remove the heat of polymerization, before entering the reactor. Solution of catalyst/activator in Toluene and the scavenger in hexane were separately and continuously admitted into the reactor to initiate the polymerization. The reactor temperature was maintained between 35 and 50° C., depending on the target molecular weight. The feed temperature was varied, depending on the polymerization rate to maintain a constant reactor temperature. The polymerization rate was varied from 0.5 Kg/hr to 4 Kg/hr.

Hexane at 30 Kg/hr was mixed with ethylene at 717 g/hr and propylene at 5.14 Kg/hr and fed to the reactor. The polymerization catalyst, dimethyl silyl bridged bis-indenyl Hafnium dimethyl activated 1:1 molar ratio with N',N'-Dimethyl anilinium-tetrakis (pentafluorophenyl)borate was introduced at the rate of at 0.0135 g/hr. A dilute solution of triisobutyl aluminum was introduced into the reactor as a scavenger of catalyst terminators: a rate of approximately 111 mole of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured at 3.7 Kg/hr. The polymer produced in this polymerization had an ethylene content of 14%, ML (1+4) 125 C. of 13.1 and had isotactic propylene sequences.

Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

Example 2

Comparative Ethylene/Propylene Polymerization Where the Propylene Residues are Atactic.

Polymerizations were conducted in a 1 liter thermostatted continuous feed stirred tank reactor using hexane as the solvent. The polymerization reactor was full of liquid. The residence time in the reactor was typically 7–9 minutes and the pressure was maintained at 400 kpa. Hexane, ethene and propene were metered into a single stream and cooled before introduction into the bottom of the reactor. Solutions of all reactants and polymerization catalysts were introduced continuously into the reactor to initiate the exothermic polymerization. Temperature of the reactor was maintained at 45° C. by changing the temperature of the hexane feed and by using cooling water in the external reactor jacket. For a typical polymerization, the temperature of feed was −10° C. Ethene was introduced at the rate of 45 gms/min and propene was introduced at the rate of 310 gms/min. The polymerization catalyst, dimethyl silyl bridged (tetramethylcyclopentadienyl) cyclododecylamido titanium dimethyl activated 1:1 molar ratio with N',N'-Dimethyl anilinium-tetrakis (pentafluorophenyl)borate was introduced at the rate of 0.002780 gms/hr. A dilute solution of triisobutyl aluminum was introduced into the reactor as a scavenger of catalyst terminators: a rate of approximately 36.8 mole per mole of catalyst was adequate for this polymerization. After five residence times of steady polymerization, a representative sample of the polymer produced in this polymerization was collected. The solution of the polymer was withdrawn from the top, and then steam distilled to isolate the polymer. The rate of formation of the polymer was 258 gms/hr. The polymer produced in this polymerization had an ethylene content of 14.1 wt. %, ML@ 125 (1+4) of 95.4.

Variations in the composition of the polymer were obtained principally by changing the ratio of ethene to propene. Molecular weight of the polymer could be increased by a greater amount of ethene and propene compared to the amount of the polymerization catalyst. These polymers are described as aePP in the Tables below.

Example 3

Analysis and Solubility of Several Second Polymer Components

In the manner described in Example 1 above, several second polymer components of the above specification were synthesized. These are described in the table below. Table 1 describes the results of the GPC, composition, ML and DSC analysis for the polymers.

TABLE 1

Analysis of the second polymer component and the comparative polymers.

| FPC | (Mn) by GPC | (Mw) by GPC | Ethylene wt % by IR | Heat of Fusion J/g | Melting Point by DSC (° C.) | ML (1 + 4) @ 125° C. |
|---|---|---|---|---|---|---|
| FPC-1 | 102000 | 248900 | 7.3 | 71.9 | 84.7 | 14 |
| FPC-2 | | | 9.4 | 30.2 | 65.2 | 27.8 |
| FPC-3 | 124700 | 265900 | 11.6 | 17.1 | 43.0 | 23.9 |
| FPC-4 | | | 12.8 | 16.4 | 42.5 | |
| FPC-5 | | | 14.7 | 13.2 | 47.8 | 38.4 |

TABLE 1-continued

Analysis of the second polymer component and the comparative polymers.

| FPC | (Mn) by GPC | (Mw) by GPC | Ethylene wt % by IR | Heat of Fusion J/g | Melting Point by DSC (° C.) | ML (1 + 4) @ 125° C. |
|---|---|---|---|---|---|---|
| FPC-6 | 121900 | 318900 | 16.4 | 7.8 | 40.3 | 33.1 |
| FPC-7 | | | 17.8 | 5.3 | 39.5 | |
| Comparative Polymers | | | | | | |
| EPR | | | 47.8 | not detected | not detected | 40 |
| AePP | | | 11.7 | not detected | not detected | 23 |

Table 2 describes the solubility of the second polymer component.

TABLE 2

| FPC | Wt. % Soluble at 23° C. | Wt. % Soluble at 31° C. | Wt. % Soluble at 40° C. | Wt. % Soluble at 48° C. |
|---|---|---|---|---|
| FPC-1 | 1.0 | 2.9 | 28.3 | 68.5 |
| FPC-3 | 6.5 | 95.7 | | |
| FPC-6 | 51.6 | 52.3 | 2.6 | |
| FPC-5 | 36.5 | 64.2 | | |
| Comparative Polymers | | | | |
| EPR | 101.7 | | | |
| aePP | 100.5 | | | |

Table 2: Solubility of fractions of the second polymer component. Sum of the fractions add up to slightly more than 100 due to imperfect drying of the polymer fractions.

Table 3 describes the composition of the fractions of the second polymer component obtained in Table 2. Only fractions which have more than 4% of the total mass of the polymer have been analyzed for composition.

TABLE 3

| | Composition: Wt % ethylene in fraction | | | | |
|---|---|---|---|---|---|
| FPC | Soluble at 23° C. | Soluble at 31° C. | Soluble at 40° C. | Soluble At 48° C. | Soluble At 56° C. |
| FPC-1 | | | 8.0 | 7.6 | |
| FPC-3 | 12.0 | 11.2 | | | |
| FPC-6 | 16.8 | 16.5 | | | |
| FPC-5 | 14.9 | 14.6 | | | |
| Comparative | | | | | |
| EPR | 46.8 | | | | |
| Atactic ePP | 11.8 | | | | |

Table 3: Composition of fractions of the second polymer component obtained in Table 2. The experimental inaccuracy in determination of the ethylene content is believed to 0.4 wt % absolute.

Example 4

Blends were made according to the composition of Table 4 and made into films varying between 4/1000 inch to 14/1000 inch by compression molding. They were tested according to the procedures described above.

Table 4: Composition and performance data for elastic film compounds in Example 4.

TABLE 4

| Polymer | Details | Example 4- | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| FPC | | | | | | | | | | | | | |
| FPC-A | 15.1% C2, 16 ML | 240 | | 223 | 206 | 190 | 223 | 206 | 190 | 223 | 206 | 190 | 223 |
| FPC-B | 12.4% C2, 13 ML | | 240 | | | | | | | | | | |
| FPC2 | 5.8% C2, 21 ML | | | | | | | | | | | | |
| SPC | | | | | | | | | | | | | |
| PD4292 | 1.5 MFR iPP | | | 17 | 33 | 50 | | | | | | | |
| PD4403 | 7 MFR iPP | | | | | | 17 | 33 | 50 | | | | |
| PD3854 | 25 MFR iPP | | | | | | | | | 17 | 33 | 50 | |
| PD4292 + 10% clay | (100 g PP/10 g Translink 370) | | | | | | | | | | | | 17 |
| PD4292 + 25% clay | (100 g PP/25 g Translink 370) | | | | | | | | | | | | |
| PD7623 | Impact Copolymer 7 MFR | | | | | | | | | | | | |
| PD9263 | Reactor copolymer 7 MFR | | | | | | | | | | | | |
| Process Oil | | | | | | | | | | | | | |
| Sunpar 150 | | | | | | | | | | | | | |
| Film Properties (oriented 200%) | | | | | | | | | | | | | |
| Adjusted Load L2 (gms) | | 1295 | 6933 | 1977 | 2303 | 4157 | 1715 | 2340 | 5199 | 1668 | 2684 | 3686 | 1607 |
| R1 | | 24.6 | 49.1 | 32.5 | 36.1 | 43.9 | 30.8 | 37.2 | 46.4 | 31.3 | 40.8 | 45.1 | 29.9 |
| R2 | | 18.9 | 45.2 | 26.2 | 30.5 | 37.6 | 24.3 | 31.6 | 40.5 | 26.4 | 37.2 | 41.9 | 24.3 |
| Hysteresis (%) | | 8.6 | -1.7 | 11.7 | 8.8 | 11.9 | 10.9 | 9.5 | 14.8 | 7.7 | 9 | 8.7 | 10 |
| Set (%) | | 10 | 48.3 | 5.8 | 9.8 | 12.4 | 8.1 | 11.5 | 22.4 | 14 | 19.9 | 34.9 | 11.6 |
| Load Decay (%) | | 13.2 | 9.79 | 13.4 | 14.1 | 13.9 | 16.5 | 14.3 | 14 | 13.1 | 14.6 | 14.4 | 17.1 |
| Load Decay (R2) | | 96.9 | 96.1 | 96.7 | 98.1 | 97 | 95.5 | 97.2 | 97.4 | 96.9 | 96.1 | 96.9 | 97.1 |
| Film Properties (unoriented) | | | | | | | | | | | | | |
| L2 (gms) | | 1293 | 2677 | 1576 | 1970 | 2671 | 1568 | 2448 | 3925 | 1649 | 2419 | 3243 | 1564 |
| R1 | | 25.9 | 34.9 | 29.9 | 34.3 | 38.8 | 30.1 | 37.2 | 42.4 | 31.2 | 39.2 | 41.7 | 29.7 |
| R2 | | 19.1 | 35.2 | 23.4 | 28.6 | 33.5 | 23.7 | 32.1 | 38.3 | 25.2 | 36.6 | 39.1 | 24.7 |
| Hysteresis (%) | | 11.2 | -3.1 | 13 | 12.1 | 11.3 | 11.9 | 11.9 | 9.8 | 11.3 | 7.2 | 6.9 | 10.3 |
| Set (%) | | 14.1 | 69 | 15 | 19 | 24.1 | 17.3 | 21.5 | 47.7 | 19.9 | 37.4 | 45.7 | 18.2 |
| Load Decay (%) | | | | 15.6 | 15.8 | 15.8 | 16.1 | 17.5 | 14.1 | | | | |
| Load Decay (R2) | | | | 97.6 | 94.8 | 94 | 95.5 | 95.5 | 98 | | | | |

TABLE 4a

| Polymer | Details | Example 4- | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| FPC | | | | | | | | | | | | | |
| FPC-A | 15.1% C2, 16 ML | 206 | 190 | 223 | 206 | 190 | 223 | 206 | 190 | 223 | 206 | 190 | |
| FPC-B | 12.4% C2, 13 ML | | | | | | | | | | | | 223 |
| FPC2 | 5.8% C2, 21 ML | | | | | | | | | | | | |

TABLE 4a-continued

| Polymer | Details | \multicolumn{12}{c}{Example 4-} |
| --- | --- | --- | --- | --- | --- | --- | --- | --- | --- | --- | --- | --- |
| | | 13 | 14 | 15 | 16 | 17 | 18 | 19 | 20 | 21 | 22 | 23 | 24 |
| SPC | | | | | | | | | | | | | |
| PD4292 | 1.5 MFR iPP | | | | | | | | | | | | 17 |
| PD4403 | 7 MFR iPP | | | | | | | | | | | | |
| PD3854 | 25 MFR iPP | | | | | | | | | | | | |
| PD4292 + 10% clay | (100 g PP/10 g Translink 370) | 33 | 50 | | | | | | | | | | |
| PD4292 + 25% clay | (100 g PP/25 g Translink 370) | | | 17 | 33 | 50 | | | | | | | |
| PD7623 | Impact Copolymer 7 MFR | | | | | | 17 | 33 | 50 | | | | |
| PD9263 | Reactor co-polymer 7 MFR | | | | | | | | | 17 | 33 | 50 | |
| Process Oil | | | | | | | | | | | | | |
| Sunpar 150 | | | | | | | | | | | | | |
| Film Properties (oriented 200%) | | | | | | | | | | | | | |
| Adjusted Load L2 (gms) | | 2244 | 3231 | 1577 | 1954 | 2843 | 1640 | 2129 | 3219 | 1748 | 2211 | 3036 | 6871 |
| R1 | | 35.5 | 41.2 | 28.7 | 32 | 39.5 | 30.3 | 35.3 | 41.6 | 31.6 | 35.2 | 40.2 | 48.4 |
| R2 | | 30.2 | 36.6 | 22.7 | 28 | 34 | 24.6 | 30.5 | 37.6 | 25.5 | 30.7 | 36.3 | 44.9 |
| Hysteresis (%) | | 11.8 | 11.9 | 10 | 7 | 9.9 | 9.7 | 8.2 | 9.2 | 12.4 | 9.3 | 9.8 | 1.5 |
| Set (%) | | 12.4 | 15.8 | 6.5 | 6.7 | 7.4 | 12.4 | 17.6 | 25 | 11.6 | 14.9 | 20.8 | 50.7 |
| Load Decay (%) | | 16.8 | 15.9 | 13.8 | 12.1 | 13 | 13.8 | 14.1 | 13.5 | 13.3 | 9.46 | 10 | 11.4 |
| Load Decay (R2) | | 98.3 | 95.1 | 97.4 | 97.4 | 97.6 | 97.2 | 97 | 97.4 | 97.2 | 99 | 98.6 | 99.8 |
| Film Properties (unoriented) | | | | | | | | | | | | | |
| L2 (gms) | | 1948 | 3046 | 1499 | 1835 | 2345 | 1603 | 1932 | 2764 | 1625 | 2032 | 2811 | 3121 |
| R1 | | 33.9 | 40.5 | 29.2 | 32.1 | 37.4 | 29.8 | 33.9 | 38.4 | 30.1 | 34.2 | 39.5 | 39.5 |
| R2 | | 29.2 | 36.3 | 22.3 | 26.9 | 32 | 24 | 29.3 | 34.3 | 24.5 | 29.5 | 35.4 | 36.6 |
| Hysteresis (%) | | 9.2 | 11 | 12 | 10.8 | 11.5 | 11.1 | 10.2 | 10.3 | 9.7 | 9.9 | 9.7 | 0.7 |
| Set (%) | | 20.8 | 29.9 | 17.5 | 18.1 | 24 | 17.5 | 19.1 | 24.1 | 19.2 | 22 | 27.5 | 68.5 |
| Load Decay (%) | | | | 14.8 | 16.2 | 16.1 | | | | | | | |
| Load Decay (R2) | | | | 97.2 | 96.7 | 93.5 | | | | | | | |

TABLE 4b

| Polymer | Details | \multicolumn{11}{c}{Example 4-} |
| --- | --- | --- | --- | --- | --- | --- | --- | --- | --- | --- | --- | --- |
| | | 25 | 26 | 27 | 28 | 29 | 30 | 31 | 32 | 33 | 34 | 35 |
| FPC | | | | | | | | | | | | |
| FPC-A | 15.1% C2, 16 ML | | | 203 | 187 | 172 | | | | 206 | 190 | 173 |
| FPC-B | 12.4% C2, 13 ML | 206 | 190 | | | | 203 | 187 | 172 | | | |
| FPC2 | 5.8% C2, 21 ML | | | | | | | | | 17 | 33 | 50 |
| SPC | | | | | | | | | | | | |
| PD4292 | 1.5 MFR iPP | 33 | 50 | 15 | 31 | 46 | 15 | 31 | 46 | 17 | 17 | 17 |
| PD4403 | 7 MFR iPP | | | | | | | | | | | |
| PD3854 | 25 MFR iPP | | | | | | | | | | | |
| PD4292 + 10% clay | (100 g PP/10 g Translink 370) | | | | | | | | | | | |
| PD4292 + 25% clay | (100 g PP/25 g Translink 370) | | | | | | | | | | | |
| PD7623 | Impact Copolymer 7 MFR | | | | | | | | | | | |
| PD9263 | Reactor copolymer 7 MFR | | | | | | | | | | | |
| Process Oil | | | | | | | | | | | | |
| Sunpar 150 | | | | 22 | 22 | 22 | 22 | 22 | 22 | | | |
| Film Properties (oriented 200%) | | | | | | | | | | | | |
| Adjusted Load L2 (gms) | | 7231 | 9686 | 1113 | 1627 | 1853 | 3624 | 4730 | 5615 | 2210 | 2071 | 4178 |
| R1 | | 50.1 | 47.8 | 27.7 | 34.2 | 41.4 | 46 | 50.7 | 52.1 | 34.7 | 43.7 | 46.8 |

TABLE 4b-continued

| Polymer | Details | \multicolumn{11}{c}{Example 4-} |
|---|---|---|---|---|---|---|---|---|---|---|---|---|
| | | 25 | 26 | 27 | 28 | 29 | 30 | 31 | 32 | 33 | 34 | 35 |
| R2 | | 47.6 | 44.4 | 21 | 28.1 | 35.8 | 42 | 46.5 | 48.9 | 29.3 | 31.2 | 40.7 |
| Hysteresis (%) | | −0.9 | 4.8 | 10.3 | 11.4 | 12.1 | 6.2 | 7 | 3.5 | 7.7 | 9.5 | 8.4 |
| Set (%) | | 67.5 | 84.9 | 8.2 | 8.2 | 6.6 | 37.3 | 51.6 | 63.2 | 11.5 | 19.2 | 27.5 |
| Load Decay (%) | | 9.36 | | 13 | 15.3 | 14.7 | 9.25 | 7.42 | 8.89 | 10.9 | 11.5 | 12.1 |
| Load Decay (R2) | | 98.4 | | 97.6 | 95.1 | 95.3 | 97.3 | 98.1 | 93 | 97.5 | 94.6 | 97.3 |
| Film Properties (unoriented) | | | | | | | | | | | | |
| L2 (gms) | | 3787 | 4432 | 1251 | 1510 | 1987 | 2845 | 3317 | 3879 | 1853 | 2071 | 2494 |
| R1 | | 41.9 | 43.5 | 29 | 33.6 | 38.6 | 41 | 43.5 | 46.1 | 33.1 | 35.8 | 38.3 |
| R2 | | 39.9 | 41.9 | 21.3 | 26.6 | 33 | 37.5 | 40.8 | 43.1 | 29 | 31.2 | 34.9 |
| Hysteresis (%) | | −0.9 | 0.8 | 14.2 | 12.3 | 12.2 | 3.8 | 4.3 | 4.4 | 11 | 6.9 | 5.5 |
| Set (%) | | 73.7 | 78.5 | 16.6 | 20.7 | 23.1 | 47.7 | 56.5 | 63.2 | 31.5 | 32.4 | 38.2 |
| Load Decay (%) | | | 19 | 17.8 | 17.9 | 17.3 | | | | 15 | 13.7 | 9.46 |
| Load Decay (R2) | | | 96.5 | 93.2 | 96 | 93.7 | | | | 90.3 | 96.3 | 97.4 |

Example 5

Blends were made in all composition of Table 4 according to the procedure described above.

TABLE 5

Flexural Modulus for Binary Blends of one FPC and one SPC as molded.

| Sample | Wt % FPC | ML of FPC | C2 Wt % of FPC | Flexural modulus (kpsi.in/in) |
|---|---|---|---|---|
| H6 | 66.7 | 25.3 | 12.0 | 18.1 |
| H7 | 77.8 | 25.3 | 12.0 | 10.1 |
| H8 | 88.9 | 25.3 | 12.0 | 5.5 |
| H9 | 100 | 25.3 | 12.0 | 3.8 |
| K5 | 55.6 | 28.9 | 14.8 | 23.1 |
| K6 | 66.7 | 28.9 | 14.8 | 7.7 |
| K7 | 77.8 | 28.9 | 14.8 | 3.9 |
| K8 | 88.9 | 28.9 | 14.8 | 1.8 |
| K9 | 100 | 28.9 | 14.8 | 1.3 |
| M6 | 66.7 | 25.6 | 17 | 4.2 |
| M7 | 77.8 | 25.6 | 17 | 1.8 |
| M8 | 88.9 | 25.6 | 17 | 1.0 |
| M9 | 100 | 25.6 | 17 | 0.8 |
| P8 | 88.9 | 16.4 | 10.8 | 7.4 |
| P9 | 100 | 16.4 | 10.8 | 5.7 |

In this example blends of a First Polymeric Component, Escorene 4292, a homoisotactic polypropylene available from Exxon Chemical Co., Houston Tex. and one Second Polymeric component (identified as SPC1 in Table 4) were made using the procedure as described above. The blends were made in a different composition range as shown by the table above. All of the compositions are within have the properties of this invention. Properties of the blend were measured as molded.

Example 6

TABLE 6

Flexural Modulus for Ternary Blends of one FPC and two SPC as molded.

| Sample | Wt % FPC | ML of FPC | C2 Wt % of FPC | Wt % FPC2 | Flexural modulus (kpsi.in/in) |
|---|---|---|---|---|---|
| AA4 | 44.4 | 31.2 | 13.4 | 27.8 | 16.6 |
| AA5 | 55.6 | 31.2 | 13.4 | 22.2 | 11.3 |
| AA6 | 66.7 | 31.2 | 13.4 | 16.7 | 7.9 |

TABLE 6-continued

Flexural Modulus for Ternary Blends of one FPC and two SPC as molded.

| Sample | Wt % FPC | ML of FPC | C2 Wt % of FPC | Wt % FPC2 | Flexural modulus (kpsi.in/in) |
|---|---|---|---|---|---|
| AA7 | 77.8 | 31.2 | 13.4 | 11.1 | 4.7 |
| AA8 | 88.9 | 31.2 | 13.4 | 5.56 | 3.4 |
| BB4 | 44.4 | 38.4 | 14.7 | 27.8 | 17.4 |
| BB5 | 55.6 | 38.4 | 14.7 | 22.2 | 13.8 |
| BB6 | 66.7 | 38.4 | 14.7 | 16.7 | 4.8 |
| BB7 | 77.8 | 38.4 | 14.7 | 11.1 | 2.9 |
| BB8 | 88.9 | 38.4 | 14.7 | 5.56 | 1.9 |
| CC5 | 55.6 | 24.9 | 12.1 | 22.2 | 17.4 |
| CC6 | 66.7 | 24.9 | 12.1 | 16.7 | 12.1 |
| CC7 | 77.8 | 24.9 | 12.1 | 11.1 | 8.7 |
| CC8 | 88.9 | 24.9 | 12.1 | 5.56 | 5.8 |
| CC9 | 100 | 24.9 | 12.1 | 0 | 4.6 |
| FF5 | 55.6 | 38.4 | 14.7 | 13.32 | 22.0 |
| FF6 | 66.7 | 38.4 | 14.7 | 10.02 | 8.4 |
| FF7 | 77.8 | 38.4 | 14.7 | 6.66 | 4.1 |
| FF8 | 88.9 | 38.4 | 14.7 | 3.33 | 2.5 |
| FF9 | 100 | 38.4 | 14.7 | 0 | 2.0 |
| DD4 | 44.4 | 23.4 | 16.8 | 27.8 | 13.2 |
| DD5 | 55.6 | 23.4 | 16.8 | 22.2 | 6.2 |
| DD6 | 66.7 | 23.4 | 16.8 | 16.7 | 2.5 |
| DD7 | 77.8 | 23.4 | 16.8 | 11.1 | 1.4 |
| DD8 | 88.9 | 23.4 | 16.1 | 5.56 | 1.1 |
| HH5 | 55.6 | 23.4 | 16.8 | 13.32 | 13.1 |
| HH6 | 66.7 | 23.4 | 16.8 | 10.02 | 4.0 |
| HH7 | 77.8 | 23.4 | 16.8 | 6.66 | 1.9 |
| HH8 | 88.9 | 23.4 | 16.8 | 3.33 | 1.1 |

In this example blends of a First Polymeric Component, Escorene 4292, a homoisotactic polypropylene available from Exxon Chemical Co., Houston Tex. and two Second Polymeric component (identified as SPC1 and SPC2 in Table 5) were made using the procedure as described above. The SPC2 has a ML(1+4)@ 125 of 14 and an ethylene content of 7.3 wt %. The composition and the ML of the SPC1 is indicated in the Table for the various SPC1 used. The blends were made in a different composition range as shown by the table above. All of the compositions are within have the properties of this invention. Properties of the blend were measured as molded.

Example 7

Comparative

TABLE 7

| Polymer | Details | Example 3 | 4 | 5 | 1 | 2 |
|---|---|---|---|---|---|---|
| FPC Comparative | | | | | | |
| EPR (from Table 3) | 47.8 C2 wt %, 40 ML | 223 | 206 | 190 | | |
| Atactic ePP | 11.7 C2 wt %, 23 ML | | | | 223 | 206 |
| SPC | | | | | | |
| PD4292 | 1.5 MFR iPP | 17 | 33 | 50 | 17 | 33 |
| Process Oil | | | | | | |
| Sunpar 150 | | | | | | |
| Film Properties (oriented 200%) | | | | | | |
| Adjusted Load L2 (gms) | | 1634 | broke | 1878 | 1398 | 6034 |
| R1 | | 56 | 56 | 49 | 65 | 78 |
| R2 | | 45 | 50 | 45 | 23 | 45 |
| Hysteresis (%) | | 35 | broke | 62 | 34 | 49 |
| Set (%) | | 19 | broke | 23 | 21 | 34 |
| Load Decay (%) | | broke | broke | broke | broke | broke |
| Load Decay (R2) | | | | | | |

Although the present invention has been described in considerable detail with reference to certain preferred versions thereof, other versions are possible. For example, other blend components can be used and multiples of the recited components may be used. Therefore the spirit and scope of the appended claims should not be limited to the description of the preferred versions contained herein.

We claim:

1. A soft, set-resistant film comprising a blend of polyolefins, said blend comprising:
    a) first polymer component present in said film in the range of from 75–98 weight percent, based on the total weight of said polyolefins;
        wherein said first polymer component has a melting point as determined by differential scanning calorimetry (DSC) in the range of from 25–70° C.; wherein said first polymer component has a heat of fusion less than 25 J/g; wherein said first polymer component is a propylene-ethylene polymer having said propylene present in said first polymer component at 80 weight percent or greater, having said ethylene present at 20 weight percent or less, and
    b) a second polymer component present in said film in the range of from 2–25 weight percent based on the total polyolefins in said film; wherein said second polymer component is a stereoregular isotactic polypropylene; wherein said second polymer component has a melting point as determined by DSC greater than 130° C., and a heat of fusion greater than 80 J/g;
        wherein said film exhibits a set equal to or less than that described by the equation:

$$7+[3/1000] \times L2$$

where L2 is the adjusted load, and wherein said film exhibits load decay that is equal to or less than 15%.

2. The soft, set-resistant film of claim 1 wherein said blend comprises an additional first polymer component; wherein said additional first polymer component has a melting point less than 100° C.; wherein said additional first polymer component has a heat of fusion less than 60 J/g; wherein said additional first polymer component is a propylene-ethylene copolymer, and wherein said propylene is present at greater than 75 weight percent, based on the total weight of the copolymer, ethylene making up the balance of said copolymer.

3. The soft, set-resistant film of claim 2 wherein said film additionally includes a process oil present in said film in the range of from 1–50 parts per hundred parts of said blend of said polyolefins.

4. A film comprising a blend of polymers, said film having excellent resistance to set and excellent resistance to load decay, said blend of polymers being substantiallly noncrosslinked, comprising:
    a) a first polymer component having:
        i) a composition distribution such that at least 75 weight percent of the polymer is isolated in two adjacent soluble fractions, each of these fractions has a composition difference of no greater than 20% (relative, of the average weight percent ethylene content of the whole first polymer component;
        ii) a melting point, as determined by differential scanning calorimeter (DSC) less than 105° C.;
        iii) a heat of fusion less than 45 J/g;
        iv) propylene and an alpha-olefin present in said first polymer component, wherein said alpha-olefin is present in said first polymer component is from 4–35 weight percent, wherein said alpha-olefin is selected from the group consisting of ethylene and C4–C12 alpha-olefin, said propylene making up the balance of said first polymer component;
        wherein said first polymer component is present in said blend in the range of from 5–100 weight percent; and
    b) an optional second polymer component, that is a crystalline polymer having:
        i) a melting point above 115° C.;
        ii) a heat of fusion above 60 J/g;
        iii) propylene present at least 90 weight percent, and an alpha-olefin present at less than 9 weight percent, wherein the total of said propylene and said alpha-olefin in said second polymer component adds to 100 weight percent;
        said second polymer component being present in said blend in the range of from 0–95 weight percent; wherein said film exhibits a set equal to or less than that described by the equation:

$$7+[9/1000] \times L2$$

where L2 is the adjusted load; and, wherein said film exhibits a load decay that is equal to or less than 20%.

5. The film of claim 4 wherein;
    a) said first polymer component has:
        i) a composition distribution such that at least 85 weight percent of the polymer is isolated in two adjacent soluble fractions, each of these fractions has a composition difference of no greater than 10% (relative) of the average weight percent ethylene content of the whole first polymer component;
ii) a melting point less than 100° C.;
iii) a heat of fusion less than 35 J/g;
iv) an alpha-olefin content of less than 20 weight percent, wherein said alpha-olefin is ethylene, wherein said first polymer component additionally contains a diene present in said first polymer component at less than 10 weight percent, said propylene making up the balance of said first polymer component;
wherein said first polymer component is present in said film in the range of from 30–100 weight percent,
b) wherein said second polymer component has:
i) a melting point above 115° C.;
ii) a heat of fusion above 70 J/g;
iii) an alpha-olefin present in the range of from 2–8 weight percent, said propylene making up the balance of said second polymer component;
wherein said second polymer component being present in said blend in the range of from 0–70 weight percent;
wherein said film exhibits a set equal to or less than that described by the equation $7+[6/1000] \times L2$ where L2 is the adjusted load; and wherein said film exhibits a load decay that is equal to or less than 16%.

6. The film of claim 4 wherein;
a) said first polymer component has;
i) a melting point in the range of from 0°–105° C.;
ii) a heat of fusion less than 25 J/g;
iii) an alpha-olefin content in the range of from 6–30 weight percent, wherein said first polymer component contains a diene present in said first polymer component at less than 5 weight percent, said propylene making up the balance of said first polymer component; said first polymer component is present in said blend from 60–100 weight percent; and
b) wherein said second polymer component has;
i) a melting point above 130° C.;
ii) a heat of fusion above 80 J/g;
iii) an alpha-olefin present in the range of from 2–6 weight percent, wherein said alpha-olefin is ethylene, the balance of said second polymer component being propylene; said second polymer component being present in said blend in the range of from 0–40 weight percent;
wherein said film exhibits a set equal to or less than that described by the equation:

$7+[3/1000] \times L2$ where L2 is the adjusted load; and wherein said film exhibits a load decay that is equal to or less than 15%.

7. The film of claim 4 wherein;
a) said first polymer component has:
i) a melting point in the range of from 20°–90° C.;
ii) an alpha-olefin content in the range of from 8–25 weight percent, wherein said alpha-olefin is ethylene, the balance of said first polymer component is propylene,
wherein said first polymer component is present in said blend from 75–100 weight percent;
b) wherein said second polymer component has:
i) a melting point in the range of from 110–170° C.;
ii) a heat of fusion above 80 J/g;
iii) an alpha-olefin present in the range of from 2–6 weight percent, wherein said alpha-olefin is ethylene, propylene making up the remainder of said second polymer component; and said second polymer component present in said blend in the range of from 0–25 weight percent.

8. The film of any of claims 4–7 wherein said film further comprises a process oil, present in said film in the range of from 1–50 parts per hundred parts of the total of said first polymer component and said second polymer component.

9. The film of any of claims 4–7 wherein said film further comprises a inorganic filler, present in said film in the range of from 2–20 parts per hundred parts of the total of said first polymer component and said second polymer component.

10. The film of any of claims 4–7 wherein said film is further manipulated after fabrication by a technique selected from the group consisting of extrusion, calendering, orientation in the range of from 10–400% and combinations thereof, said orientation being in a direction selected from the group consisting of machine direction (MD), transverse direction (TD) and biaxially;
wherein said film is annealed for up to 24 hours at up to 140° C.

11. The film of any of claims 1–7 wherein said film is laminated or coextruded with a thermoplastic on one or both sides of the film.

12. The film of any of the claims 1–7 wherein said film is a cast film.

13. A process for preparing the soft, set resistant film of claim 1 comprising:
(a) polymerizing propylene or a mixture of propylene and one or more monomers selected from $C_2$ or $C_3$–$C_{20}$ alpha olefins in the present of a polymerization catalyst wherein a substantially isotactic propylene polymer containing at least 90% by weight polymerized propylene is obtained to form a propylene polymer;
(b) polymerizing a mixture of ethylene and propylene in the presence of a chiral metallocene catalyst, wherein a crystallizable copolymer of ethylene and propylene is obtained comprising up to 35% by weight ethylene, containing isotactically, crystallizable propylene sequences; and
(c) blending the propylene polymer of step (a) with the crystallizable copolymer of step (b) to form a blend.

* * * * *